(12) United States Patent
Terada et al.

(10) Patent No.: US 6,456,041 B1
(45) Date of Patent: Sep. 24, 2002

(54) POWER SUPPLY SYSTEM FOR ELECTRIC VEHICLE

(75) Inventors: Junji Terada; Satoshi Yamamoto, both of Iwata (JP)

(73) Assignee: Yamaha Hatsudoki Kanushiki Kaisha, Iwata (JP)

( * ) Notice: Subject to any disclaimer, the term of this patent is extended or adjusted under 35 U.S.C. 154(b) by 0 days.

(21) Appl. No.: 09/601,391

(22) PCT Filed: Dec. 28, 1999

(86) PCT No.: PCT/JP99/07418

§ 371 (c)(1),
(2), (4) Date: Oct. 20, 2000

(87) PCT Pub. No.: WO00/38944

PCT Pub. Date: Jul. 6, 2000

(30) Foreign Application Priority Data

Dec. 28, 1998 (JP) .......................................... 10-374096
Oct. 25, 1999 (JP) .......................................... 11-302929

(51) Int. Cl.⁷ .............................................. H02J 7/00
(52) U.S. Cl. .................................................. 320/132
(58) Field of Search ................................... 320/131, 132, 320/DIG. 19, DIG. 21

(56) References Cited

U.S. PATENT DOCUMENTS

| | | | | |
|---|---|---|---|---|
| 5,680,031 A | * | 10/1997 | Pavlovic et al. ............. | 320/145 |
| 5,789,898 A | * | 8/1998 | Suzuki et al. ................ | 320/104 |
| 5,798,702 A | * | 8/1998 | Okamoto et al. ........... | 320/106 |
| 5,834,922 A | * | 11/1998 | Ikawa et al. ................ | 320/136 |
| 5,864,224 A | * | 1/1999 | Takechi et al. ............. | 320/152 |
| 5,896,024 A | * | 4/1999 | Bradus et al. .............. | 320/125 |
| 5,942,878 A | * | 8/1999 | Ito ............................... | 320/131 |
| 5,963,140 A | * | 10/1999 | Kawaguchi et al. ........ | 320/127 |
| 5,982,148 A | * | 11/1999 | Mercer ........................ | 320/134 |
| 6,034,507 A | * | 3/2000 | Ikawa et al. ................ | 320/136 |
| 6,114,836 A | * | 9/2000 | Hagiwara et al. ........... | 320/132 |

* cited by examiner

Primary Examiner—Edward H. Tso
Assistant Examiner—Pia Tibbits
(74) Attorney, Agent, or Firm—Ernest A. Beutler

(57) ABSTRACT

A power source system 402 for electric motor-operated vehicles adapted to determine an actual capacity of a chargeable battery 400, namely the maximum capacity learning value at the current time point after it is used in cycles, comprises; a discharge means 403 for performing refreshment discharge of the chargeable battery 400, a charge control means 404 for controlling the discharge means 403 to perform the refreshment discharge with a discharge current including a pulse waveform portion, and an actual capacity learning means 405 for learning the actual capacity of the chargeable battery 400 on the basis of discharge capacity including the discharge capacity at the time of refreshment with the pulse waveform current.

19 Claims, 15 Drawing Sheets

Charge-discharge control data (Battery controller to charger)

| No. | Description |
|---|---|
| 1 | Refreshment notification |
| 2 | 1st stage refreshment discharge current value |
| 3 | 1st stage refreshment pulse value |
| 4 | 1st stage refreshment discharge stop voltage |
| 5 | 2nd stage refreshment discharge current value |
| 6 | 2nd stage refreshment discharge stop voltage |
| 7 | Refreshment timer value |
| 8 | Charge start lowest temperature |
| 9 | Charge start highest temperature |

FIG. 4

Battery condition data (Battery controller to charger)

| No. | Description |
|---|---|
| 1 | Battery temperature 1 (single) |
| 2 | Battery temperature 2, ... , n (parallel) |
| 3 | Battery voltage |
| 4 | Residual battery capacity (at present) |
| 5 | Actual battery capacity (maximum capacity learning value at present) |

FIG. 5

Charger condition data (charger to battery controller)

| No. | Description |
|---|---|
| 1 | Charge-discharge control data request |
| 2 | Battery condition data request |
| 3 | 1st stage refreshment going on |
| 4 | 1st stage refreshment over |
| 5 | 2nd stage refreshment going on |
| 6 | 2nd stage refreshment over |
| 7 | Charge going on |
| 8 | Waiting for charge |
| 9 | Charge over |
| 10 | Charge stop |

FIG. 6

POWER SUPPLY SYSTEM FOR ELECTRIC VEHICLE

TECHNICAL FIELD

This invention relates to a power source system for motor-operated vehicles in which it is possible to determine an actual power capacity, a maximum capacity at the current time point, of chargeable batteries such as Ni—Cd battery, Ni—MH battery, etc. for use as energy sources in for example electric motor-operated bicycles, electric motor-operated wheelchairs, electric motor-operated scooters, etc.

BACKGROUND ART

To control the residual capacity of a battery, it is necessary to learn the change in the actual capacity as the battery is used in cycles under different conditions. Detecting the change in the actual capacity is called "capacity learning". A general method of the capacity learning is to learn the capacity change from the discharge capacity from the fully charged status to a preset voltage. There are three types of discharge; the discharge on the device side, the discharge by refreshment, and the combination of the two.

In order to learn the capacity change by the discharge on the device side, it is necessary to discharge the battery down to the terminal state of discharge. However, in the case of devices that can cause problems when the battery is used to run down to the discharge stop, especially in the case of electric motor-operated bicycles for example, the battery is very rarely discharged to the discharge stop state. This makes it difficult to accurately learn the capacity in regular cycles.

And, in order to learn the capacity change by the refreshment discharge of the constant current and constant resistance type, restriction of cooling ability poses a problem: the discharge current must be set to a value much lower than that of a device (vehicle) in operation. A resultant problem of this is that accurate learning of the actual capacity is impossible depending on the state of deterioration (especially the deterioration due to increase in the internal resistance) of the battery. For example, while the current when the electric motor-operated vehicle is running is about 5 A to 27 A, the above-mentioned refreshment current is about 0.5 A. While the refreshment current can be increased by the increase in the cooling ability, it invites an increase in the cost.

The object of the invention made in view of the above is to provide a power source system for electric motor-operated vehicles, that makes it possible to accurately learn the actual power capacity.

DISCLOSURE OF THE INVENTION

As shown in a claim constitution diagram of FIG. 15, the invention of claim 1 is a power source system 402 adapted to learn an actual capacity, or a maximum capacity to be learned at a current time point when a chargeable battery 400 is used in cycles, characterized in that the system comprises; a discharging means 403 for performing refreshment discharge of the chargeable battery 400, a discharge control means 404 for controlling the discharging means 403 so that the refreshment discharge with the discharging means 403 is performed with a discharge current partially including a pulse waveform, and an actual power capacity learning means 405 for learning the actual power capacity of the chargeable battery 400 based on a discharge capacity including the discharge capacity during refreshment due to the pulse waveform current.

The invention of claim 2 is based on claim 1, characterized in that the actual power capacity learning means learns the actual power capacity of a chargeable battery on the basis of a sum of a travel discharge capacity determined by vehicle running and a discharge capacity determined by the refreshment.

The invention of claim 3 is based on claim 1 or 2, characterized in that the refreshment discharge is performed with a discharge current consisting of a part formed with a pulse waveform and a part formed with a constant current.

The invention of claim 4 is based on one of claims 1 to 3, characterized in that the discharge control means 404 controls the discharging means 403 so that the refreshment discharge is divided into two steps with the first step being performed with a pulse waveform current greater than the current of the second step discharge and with the second step discharge being performed with a constant current, and in that the actual power capacity learning means 405 learns the actual power capacity from the discharge capacity for the period ending at the end of the first step of discharge.

The invention of claim 5 is based on claim 4, characterized in that the discharge control means 404 controls the discharging means 403 so that the average discharge capacity (electric power) for the first step of discharge is nearly equal to the discharge capacity for the second step of discharge.

The invention of claim 6 is based on claim 4 or 5, characterized in that the discharge control means 404 switches the discharge from the first step to the second step when the battery voltage reaches a predetermined value.

The invention of claim 7 is based on one of claims 4 to 6, characterized in that the actual power capacity learning means 405 learns the actual power capacity of the chargeable battery in the case a previous charging is finished without interruption and in the case the number of charge and discharge cycles from the first or previous refreshment discharge is within a predetermined value.

The invention of claim 8 is based on one of claims 1 to 7, characterized in that the discharge control means 403 is provided with an external switch means for entering a refreshment requiring signal to the discharge control means 404 to make the discharging means 403 perform a refreshment discharge.

BRIEF DESCRIPTION OF DRAWINGS

FIG. 4 is a table for explaining signal data exchanged between a battery controller and a charger in the power source system.

FIG. 5 is a table for explaining signal data exchanged between a battery controller and a charger in the power source system.

FIG. 6 is a table for explaining signal data exchanged between a battery controller and a charger in the power source system.

THE BEST FORMS OF EMBODYING THE INVENTION

Embodiments of the invention will be hereinafter described in reference to the appended drawings.

Figure 1:
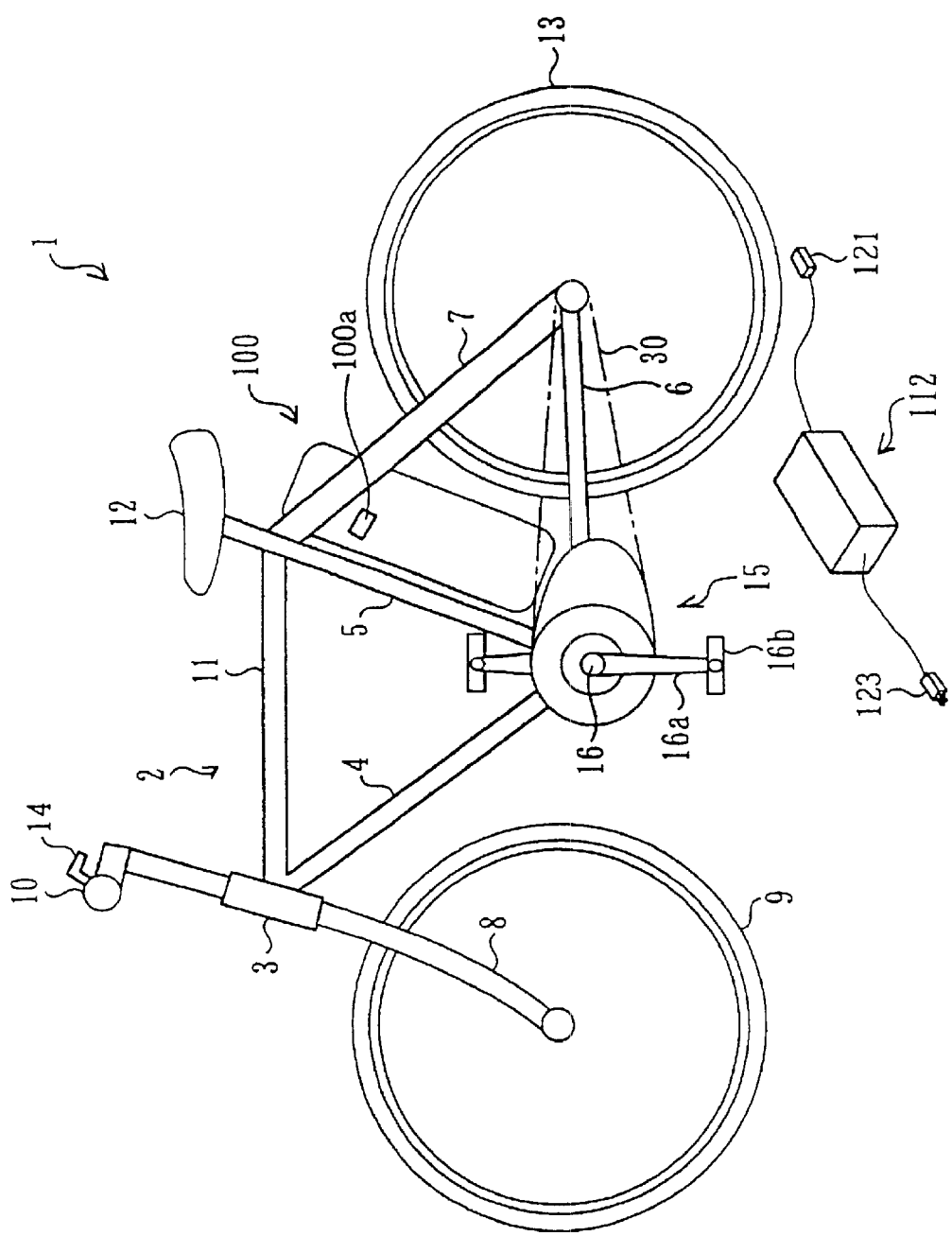
FIG. 1 is a side view of an electric motor-assisted bicycle as a first embodiment of the invention.
Figure 2:
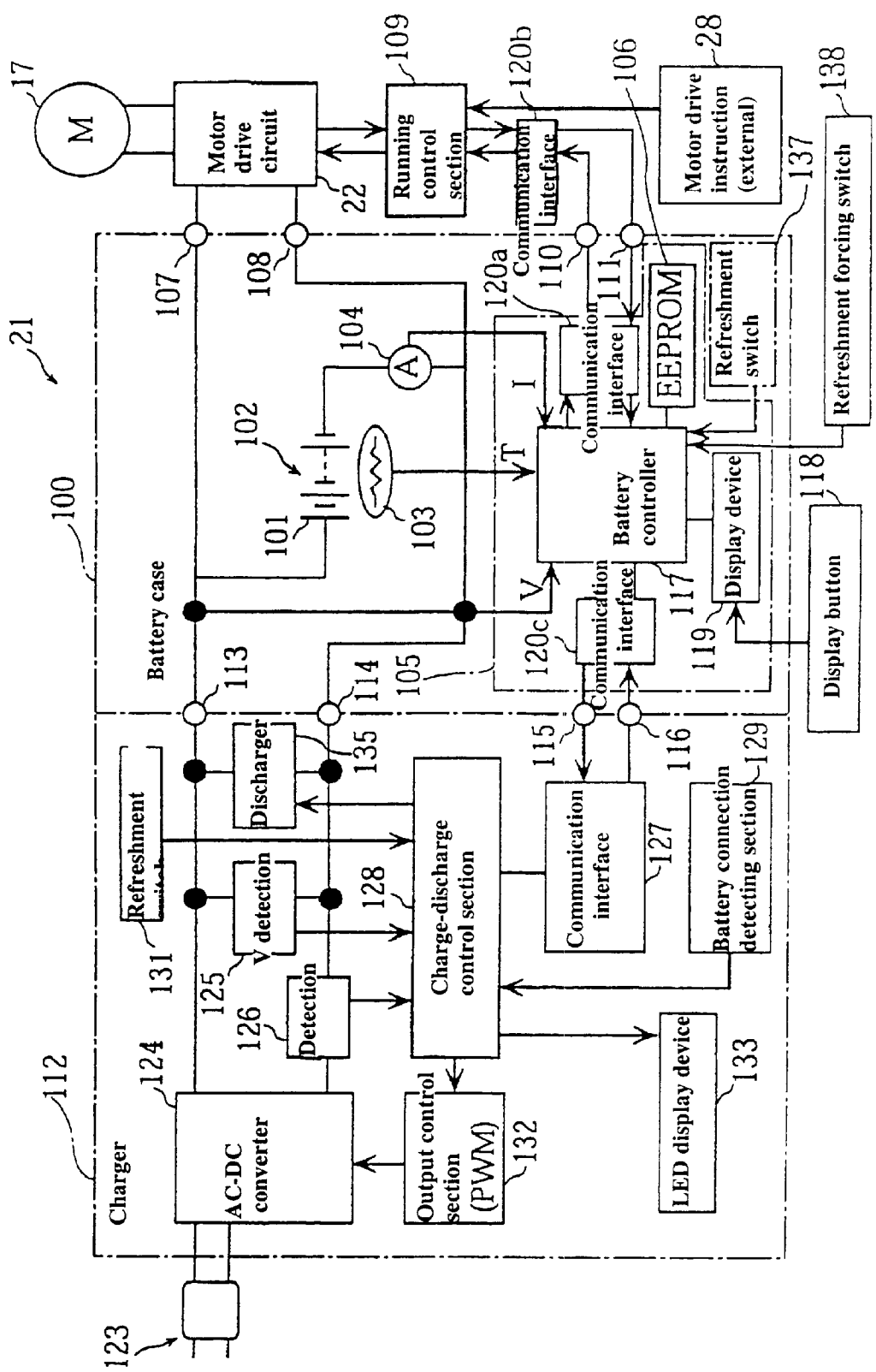
FIG. 2 is a block constitution diagram of a power source system in the first embodiment.
Figure 3:
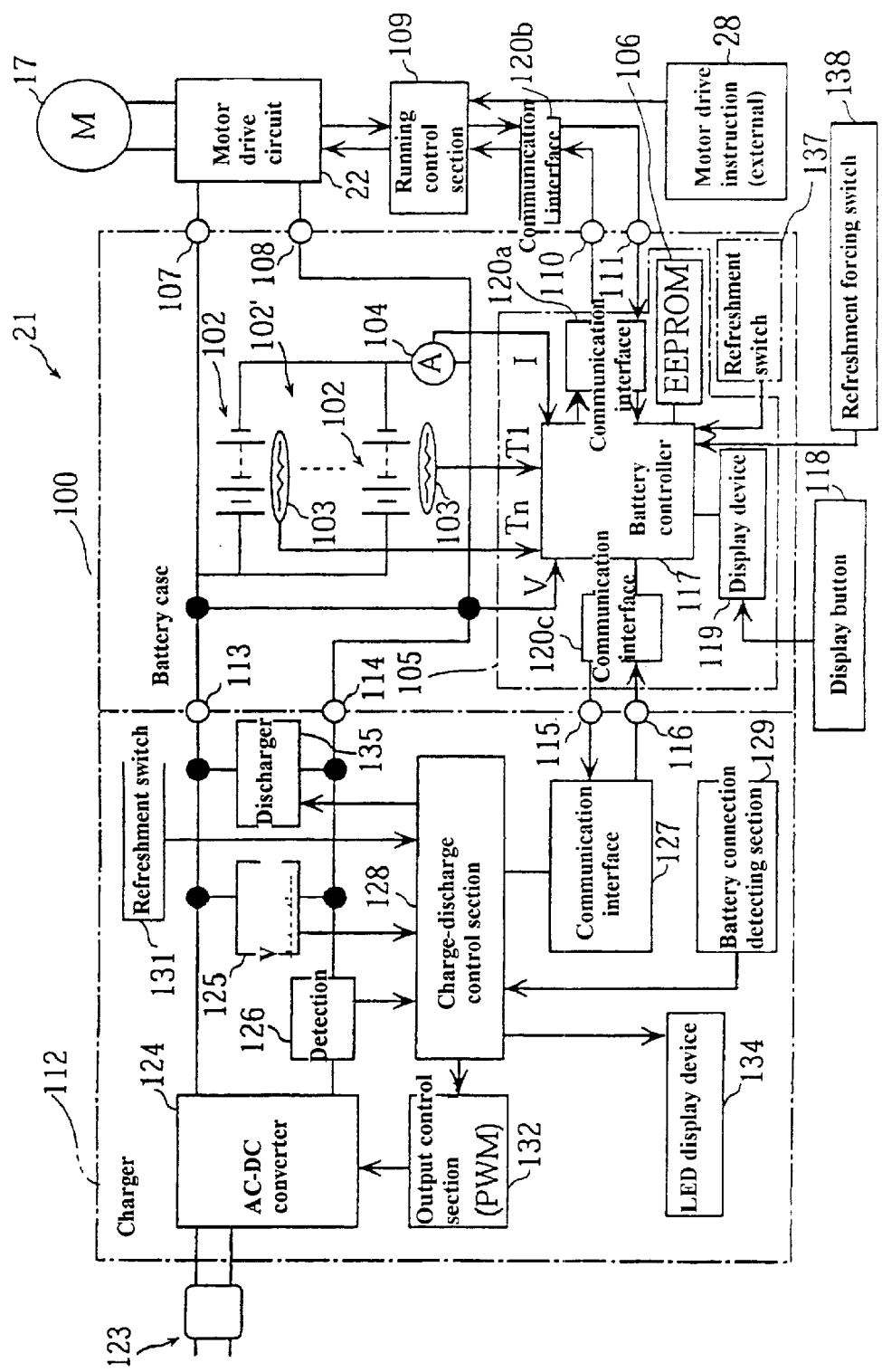
FIG. 3 is a block constitution diagram of a modified example of the power source system shown in FIG. 2.
Figure 7:
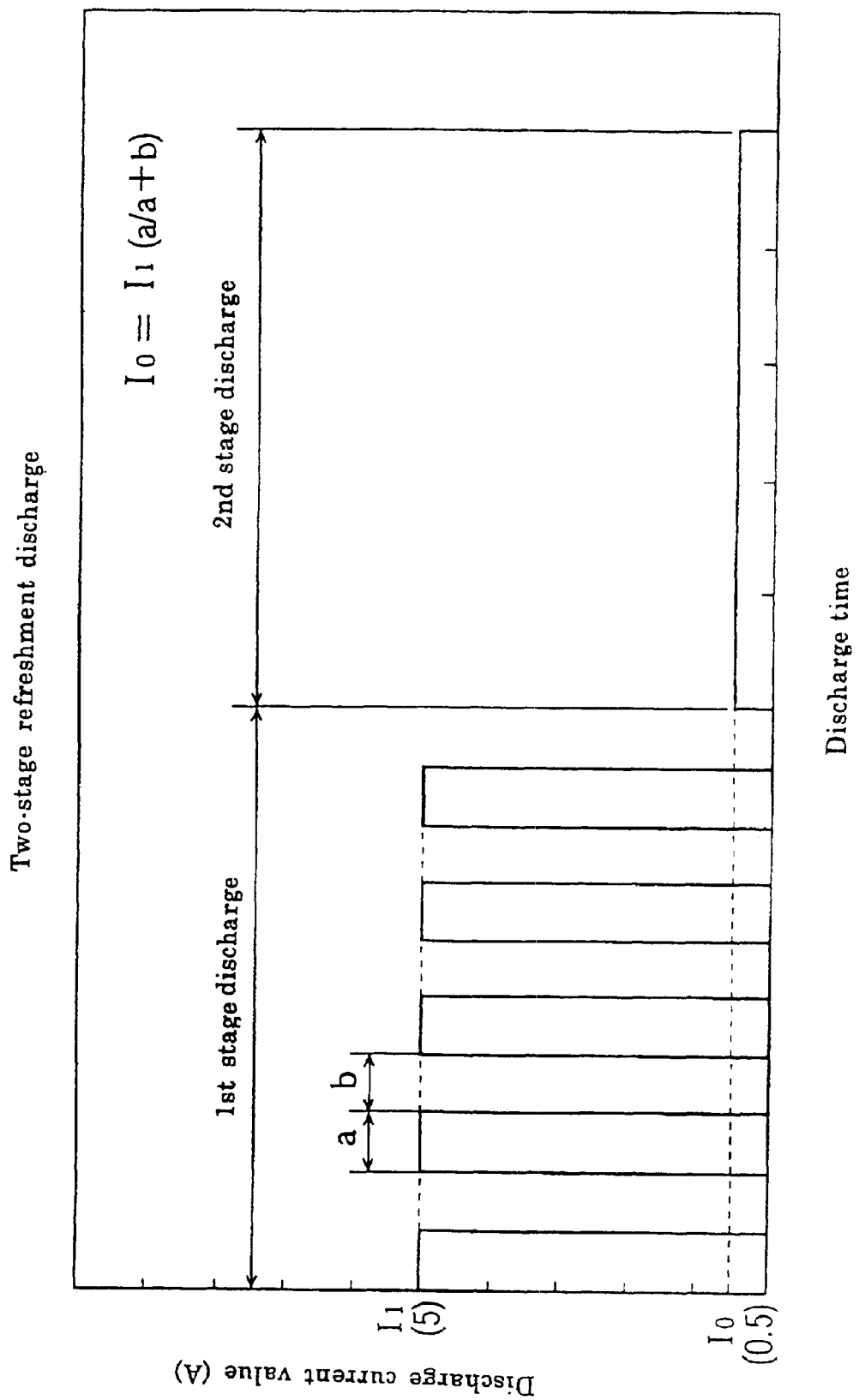
FIG. 7 is a characteristic diagram showing the change in the discharge current during the refreshment discharge of the chargeable battery.
Figure 8:
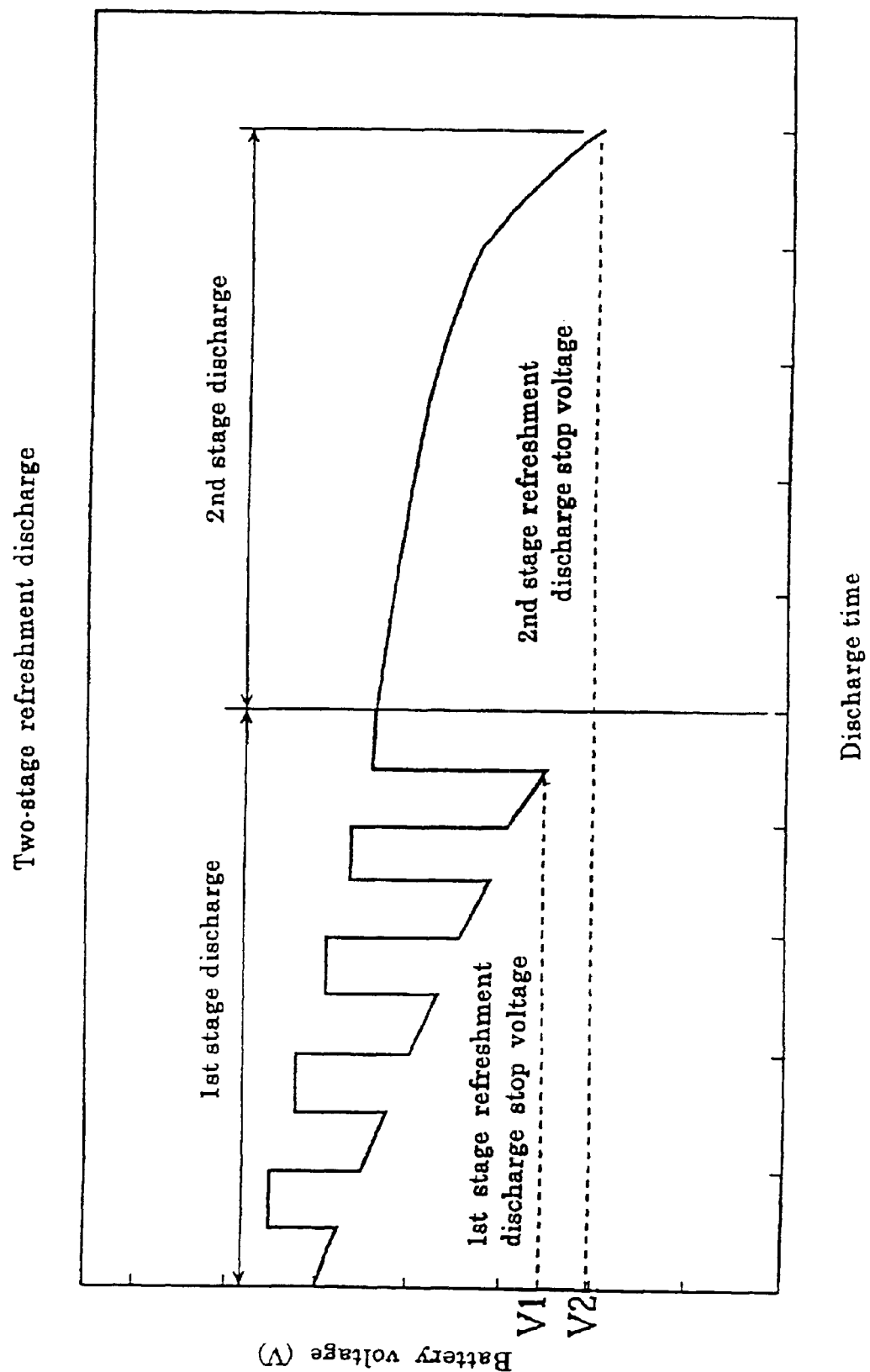
FIG. 8 is a characteristic diagram showing the change in the battery voltage during the refreshment discharge of the chargeable battery.
Figure 9:
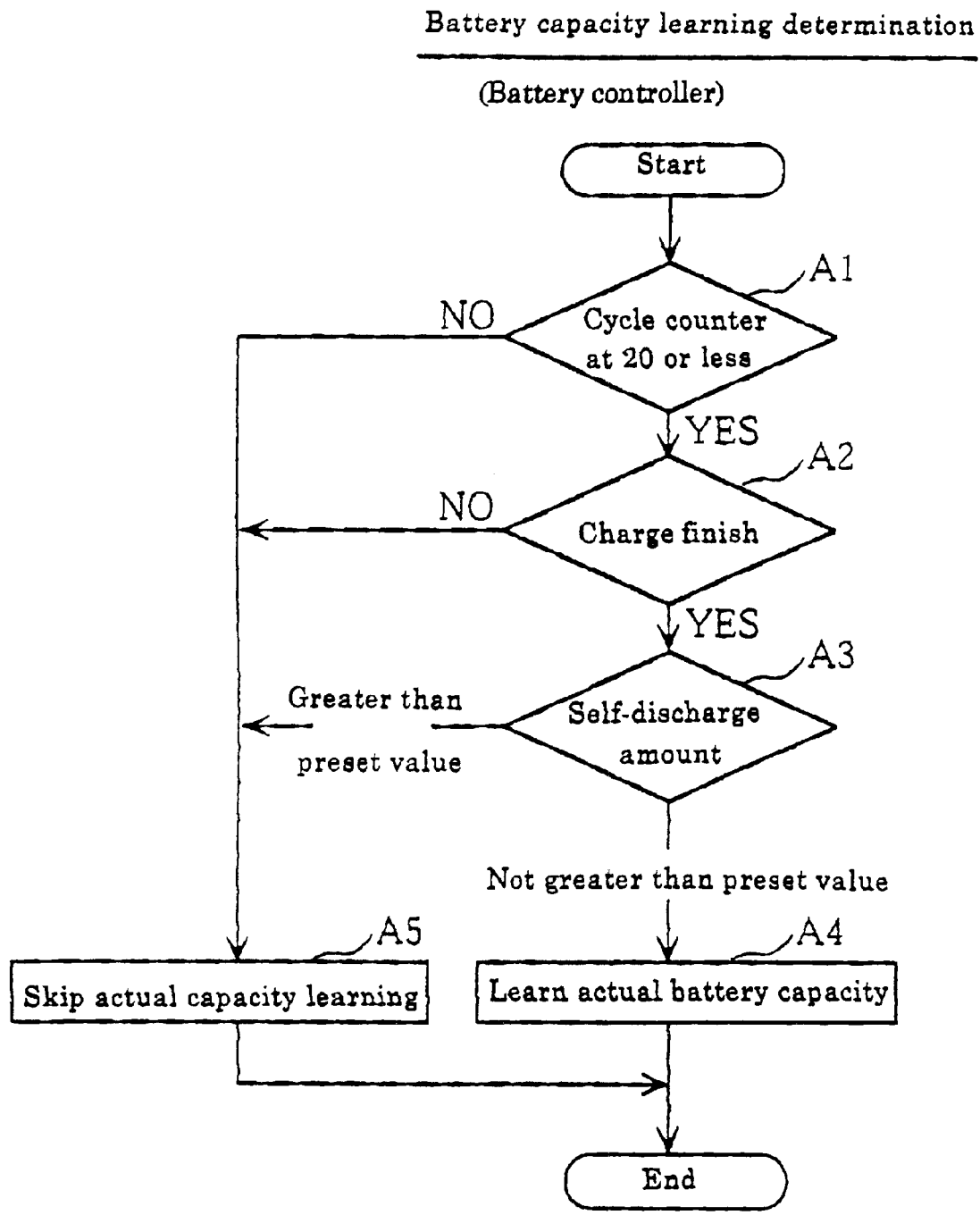
FIG. 9 is a flowchart for explaining the operation of the battery controller.
Figure 10:
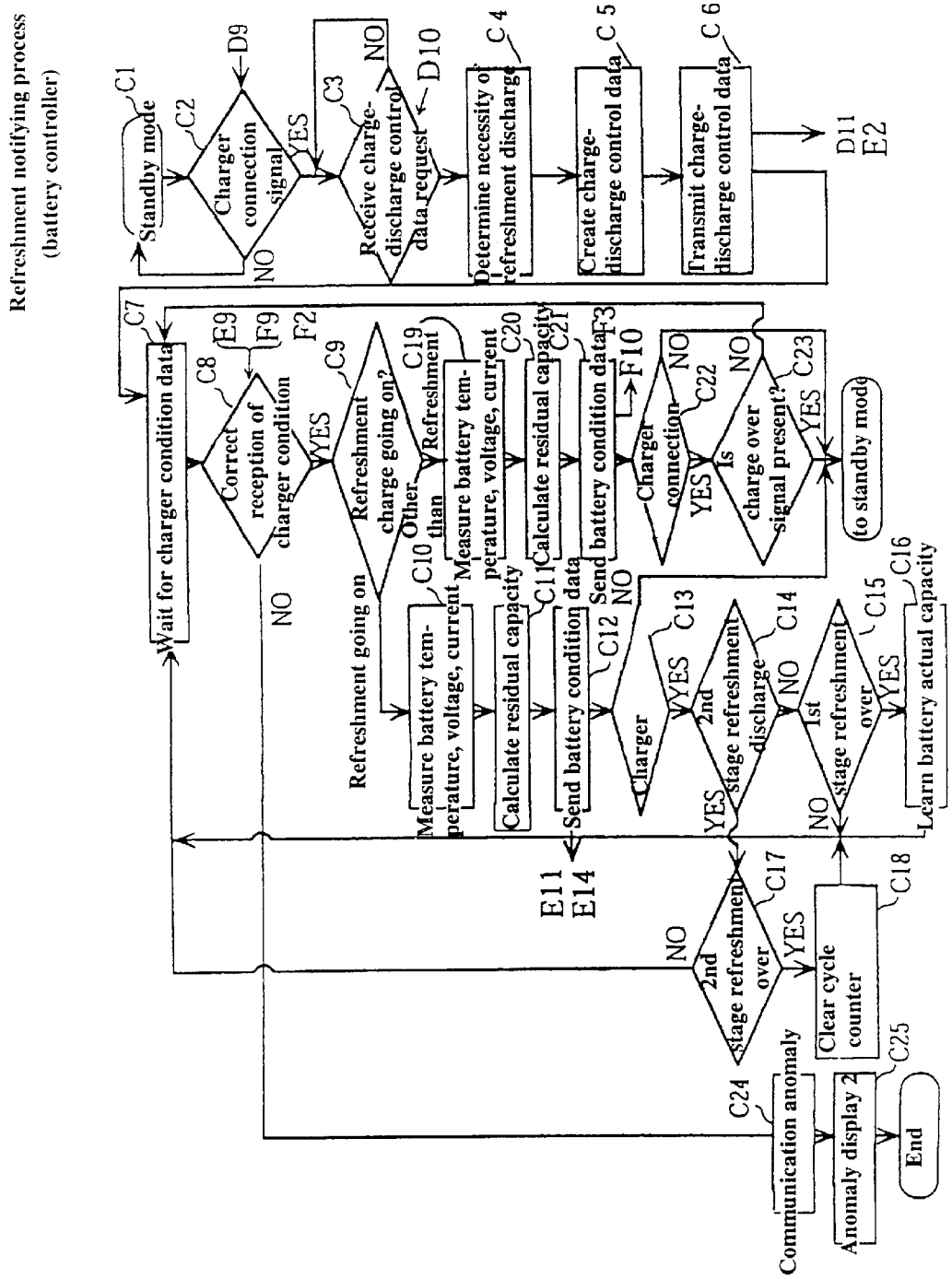
FIG. 10 is a flowchart for explaining the operation of the battery controller.
Figure 11:
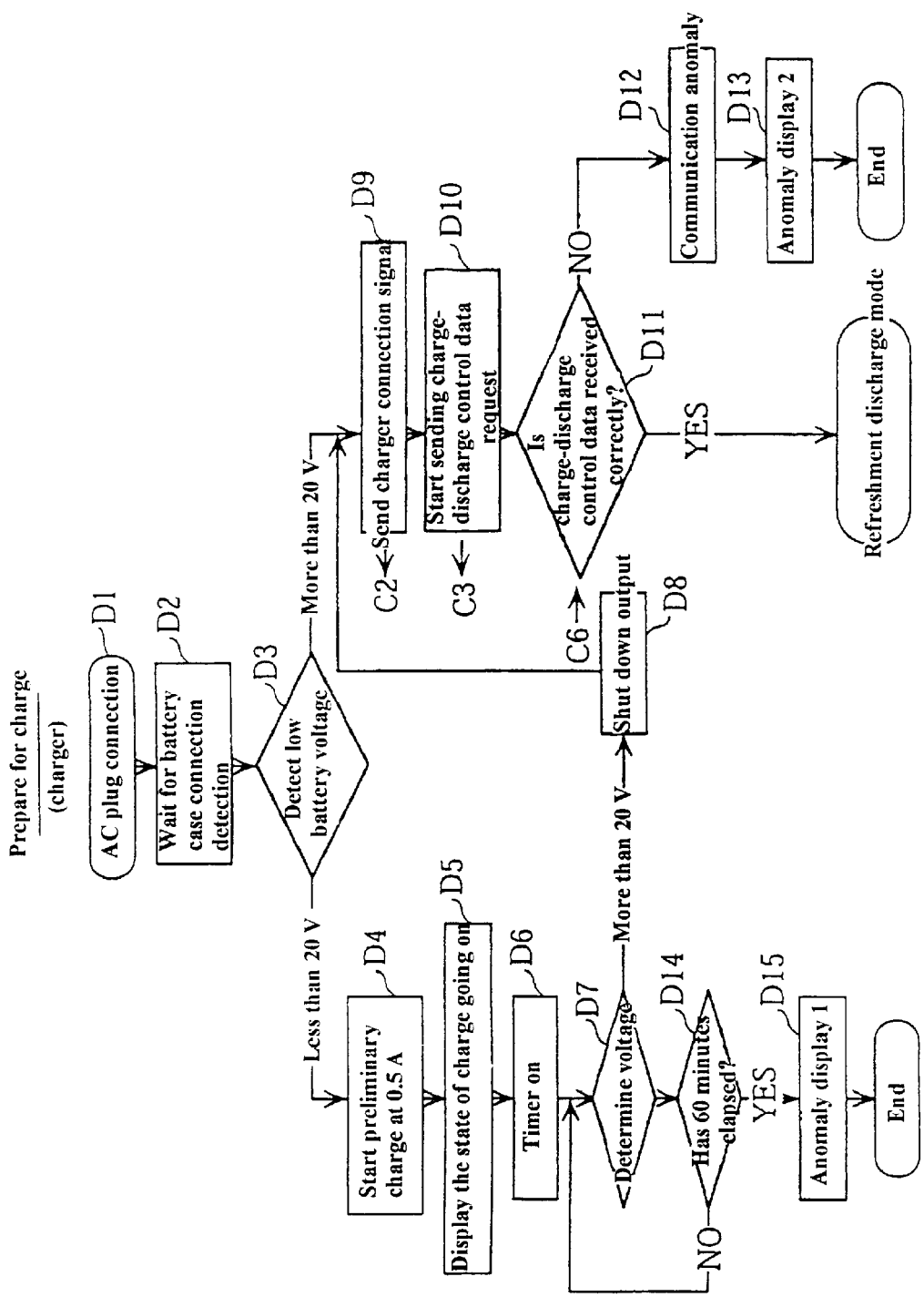
FIG. 11 is a flowchart for explaining the operation of the charger.
Figure 12:
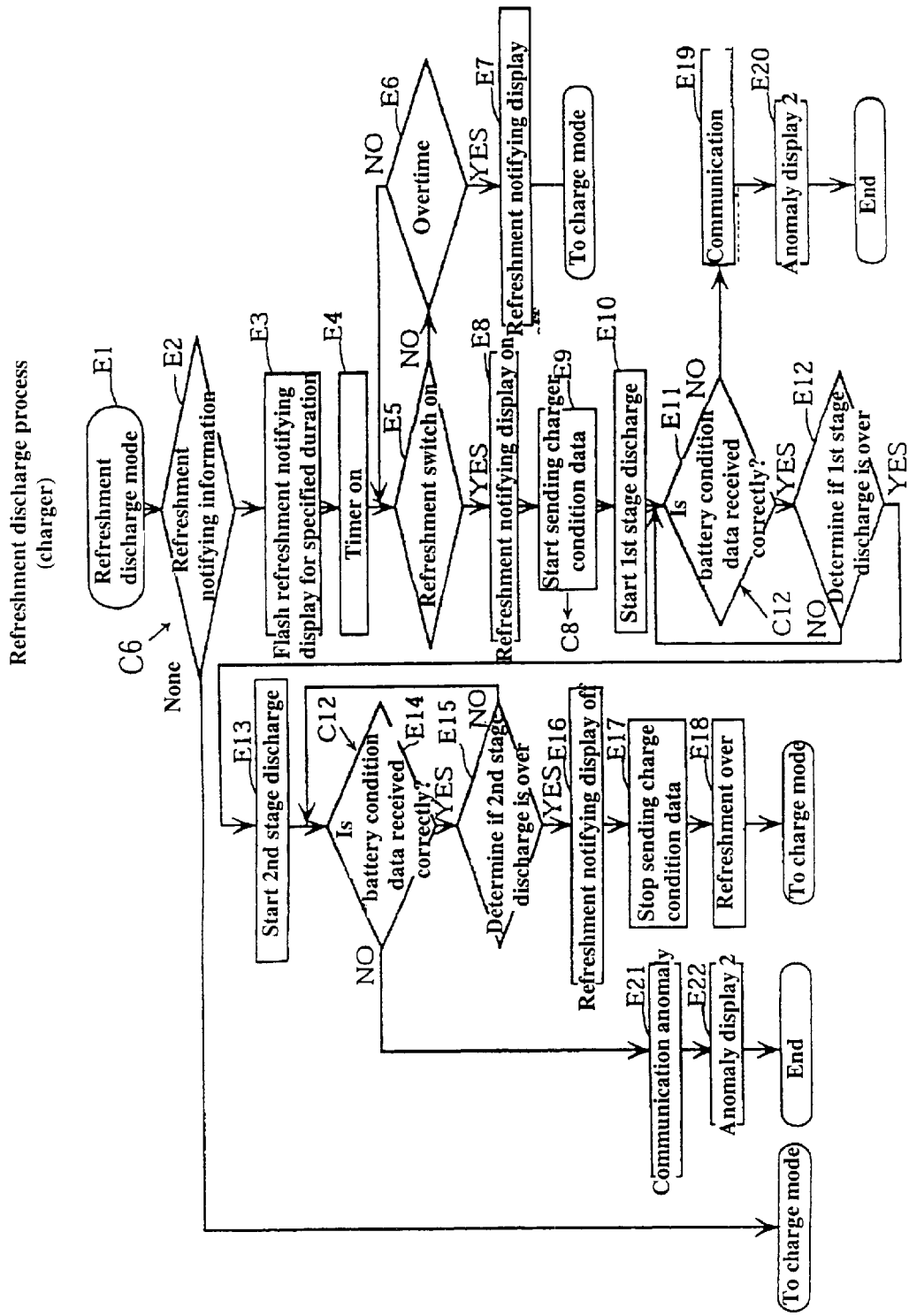
FIG. 12 is a flowchart for explaining the operation of the charger.

FIGS. 1 to 13 are for describing a power source system for electric motor-assisted bicycle as a first embodiment of the invention. FIG. 1 is a side view of an electric motor-assisted bicycle, or an electric motor-operated vehicle, in which the charger of the power source system is not mounted on the vehicle and a removable battery case is mounted on the vehicle. FIG. 2 is a block constitution diagram of the above-mentioned power source system. FIG. 3 is a block constitution diagram of a modified example of the power source system shown in FIG. 2. FIGS. 4 to 6 are tables for explaining signal data exchanged between a battery controller and a charger in the above-mentioned power source system. FIGS. 7 and 8 are characteristic diagrams showing the relation between discharge current and voltage when discharging the chargeable battery. FIGS. 9 and 10 are flowcharts for explaining the operation of the battery controller. FIGS. 11 and 12 are flowcharts for explaining the operation of the charger.

In the drawings is shown an electric motor-assisted bicycle, or an electric motor-operated vehicle, 1 in which the charger 112 of the power source system is not mounted on the vehicle and a removable battery case 100 is mounted on the vehicle 1. The electric motor-assisted bicycle 1 comprises a vehicle body frame 2 which comprises; a head pipe 3, a down tube 4 extending from the head pipe 3 obliquely rear downward, a seat tube 5 rising up from the rear end of the down tube 4, paired right and left chain stays 6 extending from the rear end of the down tube 4 generally horizontally rearward, paired right and left stays 7 interconnecting the rear ends of the chain stays 6 and the upper end of the seat tube 5, and a top tube 11 interconnecting the head pipe 3 and the seat tube 5.

A front fork 8 is supported for right and left steering about its axis on the head pipe 3. A front wheel 9 is shaft-supported at the lower end of the front fork 8. Steering handlebars 10 are secured to the upper end of the front fork 8. A saddle 12 is attached to the upper end of the seat tube 5. A rear wheel 13 is shaft-supported at the rear ends of the chain stays 6.

An instrument panel (not shown) is attached to the center of the steering handlebars 10. A display device may be provided on the instrument panel to indicate the necessity of a refreshment discharge when the necessity occurs.

A power unit 15 is mounted on the lower end part of the vehicle body frame 2 to output a resultant force consisting of a pedal force (human power) applied to pedals 16b and transmitted to a crankshaft 16 through crank arms 16a attached to both projecting ends of the crankshaft 16 and an assist power produced with a built-in electric motor 17 in proportion to the pedal force. That is to say, the magnitude of the pedal force is the motor drive instruction 28. The output from the power unit 15 is transmitted to the rear wheel 13 through a chain 30.

Incidentally, the bicycle 1 of this embodiment is provided with a self-propulsion lever 14 for inputting a motor drive instruction 28 from outside by operating the self-propulsion lever 14 to make it possible to run the bicycle with the power only from the electric motor 17 without inputting human power to the pedals 16b.

The battery case 100 for providing power to the electric motor 17, etc. is removably installed in the vehicle body along the back side of the seat tube 5 and between the right and left seat stays 7, 7. The battery case 100 holds a (chargeable) battery 102 constituted by series-connecting a plural number of single batteries 101, and is provided with a temperature sensor 103 for detecting the temperature of the battery 102 and an ammeter 104 for measuring the current value of the battery 102. The battery case 100 is further provided with a battery controller 105 for controlling the battery 102.

The battery case 100, upon being installed in the vehicle body, is automatically connected through connectors 107, 108 to a motor drive circuit 22, and automatically connected through connectors 110, 111 and communication interfaces (IFs) 120a, 120b to a running control section 109 for controlling the travel of the electric motor-assisted bicycle 1.

At the time of charging, the battery case 100 in the state of being either removed from or mounted on the vehicle body is connected to the output side of a charger 112, not mounted on the vehicle and independently constituted, through connectors 113, 114, and is also connected through connectors 115, 116 and communication interfaces 127, 120c of the charger 112. In FIG. 1, the symbol 100a denotes a charge inlet provided on the battery case 100 and here are disposed the battery case side terminals of the connectors 113, 114, 115, and 116. The charger 112 has a charge plug 121. The charger side terminals of the connectors 113, 114, 115, and 116 to be plugged into the charge inlet 100a are disposed inside the plug 121. The battery case 100 and the charger 112 constitute the power source system 21 of this embodiment. Incidentally, the connectors 107, 108 may be made common to the connectors 113, 114, and also the connectors 110, 111 may be made common to the connectors 115, 116, respectively.

The battery controller 105 receives input data of; battery temperature T from the temperature sensor 103, current value I from the ammeter 104, and voltage V from the battery 102, and comprises a battery control section 117 for controlling the refreshment discharge of the chargeable battery 102, an EEPROM 106 for storing specific data, a display device 119 which, if a display button 118 is pressed when displaying is required on the basis of signals from the battery control section 117, displays residual battery capacity and refreshment notification information, a communication interfaces 120c, 120a for performing communication with the charger 112 and the running control section 109. Incidentally, the display device 119 may be provided in the display panel section on the vehicle side where speedometer, etc. are disposed.

The above-mentioned specific data stored in the EEPROM 106 include such data as; the number of charges, the number of discharges, and the number of charge-discharge cycles since the first or previous refreshment discharge; and the actual capacity of the battery 102, the discharge capacity at the time of discharge, and whether or not a refreshment discharge has bee performed after the necessity of refreshment discharge is displayed.

The battery control section 117 functions to determine the necessity of refreshment discharge and to display the residual capacity of the battery on the display device 119 based on the conditions of the chargeable battery 102 such as the battery temperature, voltage, and residual capacity; and based on the battery history such as the number of charges, the number of discharges, the number of charge-discharge cycles, the difference between the actual battery capacity and the discharge capacity, and the occurrence of a refreshment discharge since the first or previous refreshment discharge. Incidentally, the necessity of the refreshment discharge may be displayed on the display device 119.

The battery control section 117 further functions as an actual capacity learning means which determines the maximum actual capacity at a current time point of the chargeable battery 102 from a total discharge capacity as the sum of the discharge with devices, namely the discharge by vehicle running, and the refreshment discharge capacity for the period ending at the end of the first stage discharge which will be described later.

The charger 112 comprises; an AC-DC converter 124 for converting alternate current supplied by plugging the plug 123 to an outlet into direct current, a voltmeter 125 for measuring voltage value and current value of the output from the converter 124, an ammeter 126, a discharger (discharge means) 135 for performing refreshment discharge of the chargeable battery 102, and a charge-discharge control section 128 for receiving inputs of measurement values from the voltmeter 125 and the ammeter 126, and specific signals from the communication interface 127.

The charger 112 is also comprises a battery connection detecting section 129 for outputting, to the charge-discharge control section 128a, a connection signal indicating that the charger 112 is connected to the battery case 100.

The charger 112 is also comprises a refreshment switch 131 which, when pressed by an operator, outputs a refreshment discharge instruction in the case the necessity of the refreshment discharge is displayed on a display device 133 which will be described later. Incidentally, the refreshment switch may be provided on the battery case 100 side as shown with the symbol 137 in FIG. 2.

The output of the AC-DC converter 124 is controlled with the charge-discharge control section 128 through an output control section 132. The display device 133 and the discharger 135 are controlled with the charge-discharge control section (discharge control means) 128. On the display device 133 are displayed such information as; waiting for charge, being charged, charge being over, charge stop, refreshment notice, being refreshed, and refreshment being over. Of those pieces of information, the "refreshment notice" may also be displayed simultaneously on the display device 119 on the battery case 100 side.

In the case a battery 102' as shown in FIG. 3 comprises a plural number of batteries 102, . . . , 102 connected in series, it is constituted that a plural number of temperature sensors 103, . . . , 103 are provided to detect the temperatures of respective batteries, and detected values T1, . . . , Tn are inputted to the battery control section 117. In FIG. 3, the same symbols as those in FIG. 2 denote the same or equivalent parts.

Next in reference to FIGS. 4 to 6, signal data exchanged between the battery controller 105 and the charger 112 in the electric motor-assisted bicycle 1 will be described. FIGS. 4 to 6 show Nos. of the signal data and the contents corresponding to the Nos.

FIG. 4 shows charge-discharge control data transmitted collectively to the charger 112. The data includes "refreshment notice" for No. 1, "1st stage refreshment discharge current value" for No. 2, "1st stage refreshment pulse value" for No. 3, "1st stage refreshment discharge stop voltage" for No. 4, "2nd stage refreshment discharge current value" for No. 5, "2nd stage refreshment discharge stop voltage" for No. 6, "refreshment timer value" for No. 7, "lowest temperature for charge start" for No. 8, and "highest temperature for charge start" for No. 9. The "refreshment notice" is concretely indicated with "Yes" or "No" functioning as a signal of notifying whether or not a refreshment discharge is required.

FIG. 5 shows battery condition data transmitted collectively from the battery controller 105 to the charger 112, and the data includes; "battery temperature (1)" for No. 1, "battery temperature (2)" for No. 2, "battery voltage" for No. 3, "residual battery capacity at present" for No. 4, and "actual battery capacity, or maximum capacity learning value at present" for No. 5. Here, the "maximum capacity learning value" refers to the maximum capacity value at the present time point in the course of gradual decrease in the maximum capacity as the battery gradually deteriorates as it repeats charge and discharge.

The above-mentioned battery temperature (1) refers to the battery temperature in a constitution with a single set of battery as shown in FIG. 2, and the battery temperature (2) refers to the temperature of the second set of battery in a constitution with two sets of batteries. When a plural number of batteries are provided as shown in FIG. 3, there are temperatures (1) to (n).

FIG. 6 shows charger condition data transmitted collectively from the charger 112 to the battery controller 105, and the data includes; "charge-discharge control data request" for No. 1, "battery condition data request" for No. 2, "1st stage refreshment on" for No. 3, "1st stage refreshment over" for No. 4, "2nd stage refreshment on" for No. 5, "2nd stage refreshment over" for No. 6, "charging" for No. 7, "waiting for charge" for No. 8, "charge over" for No. 9, and "charge stop" for No. 10. Here, the "charge over" means that the battery has been charged 100 percent. The "charge stop" means that charge has been stopped due to some reason such as that further continued charge is dangerous, etc.

Next in reference to FIGS. 7 and 8, the second stage of refreshment discharge performed in this embodiment will be described.

As shown in FIG. 7, the first stage of discharge is performed by applying a pulse waveform of a current $I_i$, an application time (a), and an interruption time (b), and the second stage of discharge is continued with a constant current $I_0$ for a specified period of time. In this case, the periods of time (a) and (b) are set so that $I_0 = I_1 \times (a/a+b)$, namely the power consumed by the discharge is approximately the same between the first and second stages. Incidentally for example, the discharge current value $I_1$ for the first stage is 5 A with the motor when the vehicle is running, and the discharge current value $I_0$ for the second stage is one-tenth of $I_1$, namely 0.5 A.

As shown in FIG. 8, in the first stage of discharge, when the battery voltage lowers to a specified charge stop voltage V1, the discharge is switched to the second stage which is continued until the battery voltage lowers to the charge stop voltage V2. For the above-mentioned battery voltages V1 and V2, the voltages No. 4 and No. 6 in FIG. 4, respectively "the first stage refreshment discharge stop voltage" and "the second stage refreshment discharge stop voltage" are used.

Figure 13:
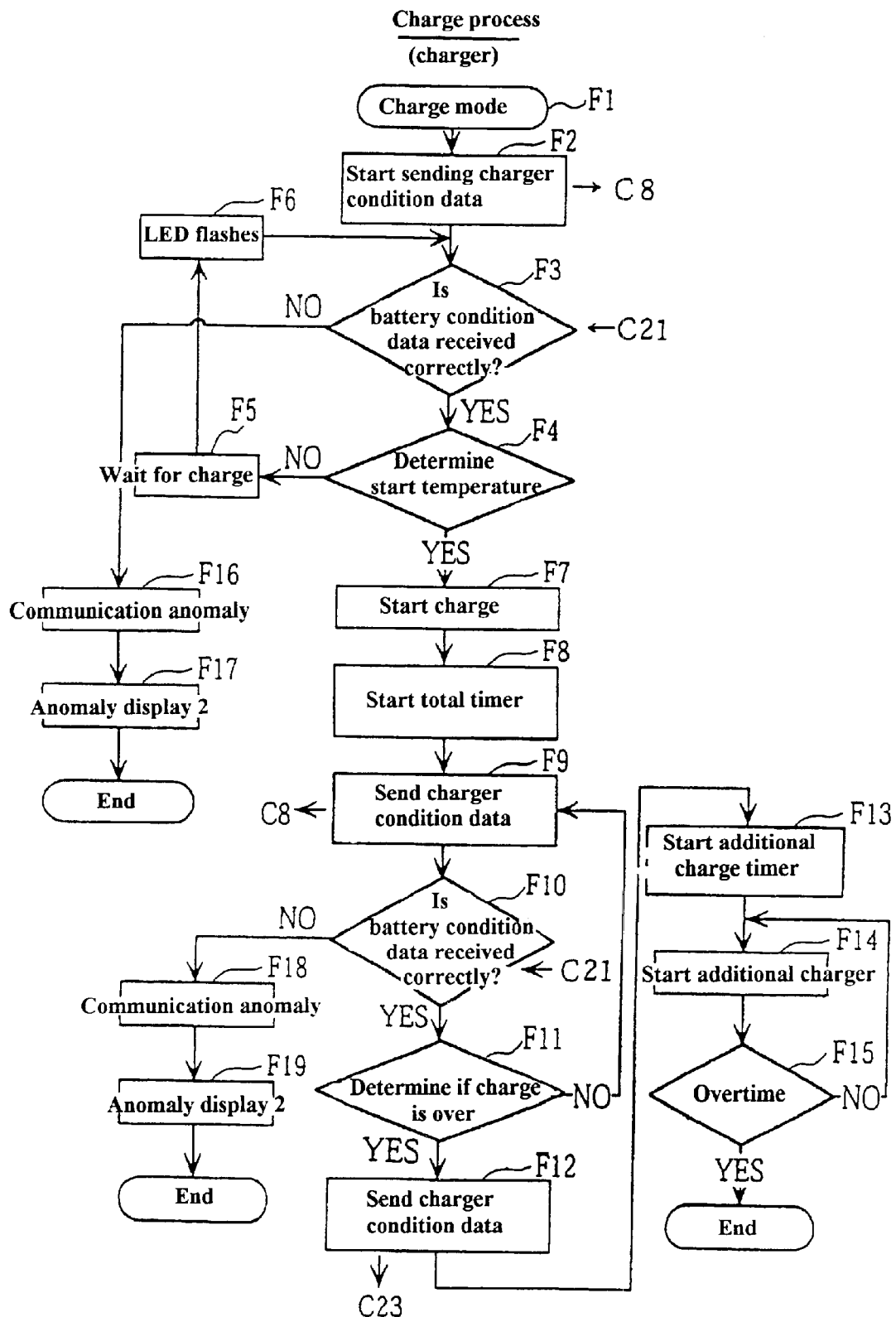
FIG. 13 is a flowchart for explaining the operation of the charger.

Next in reference to the flowcharts of FIGS. 9 to 13, operation of the battery controller 105 and the charger 112 in the power source system 21 will be described. FIGS. 9 and 10 show the operation of the battery controller 105 and FIGS. 11 to 13 show the operation of the charger 112. FIG. 9 shows the process of battery capacity learning determination.

The process of battery capacity learning is performed when the first stage stop voltage is detected during the first stage of a refreshment discharge. As shown in FIG. 9, if the cycle counter indicates the number of charges and discharges of the chargeable battery 102 not greater than 20, charging the chargeable battery 102 is over, and the self-discharge amount is not greater than a preset value (steps A1 to A3), learning the actual battery capacity is performed (step A4). On the other hand, if the counter indicates a number greater than 20, or the charge is not over yet, or the self-discharge amount is greater than the preset value, the learning the actual battery capacity is skipped to end this process. The above-mentioned self-discharge amount in the step A3 is the amount of electricity naturally discharged with the lapse of time.

Next in reference to FIG. 10, the refreshment notifying process with the battery controller will be described.

Under conditions that; the battery controller 105 is in the standby mode (step C1), a charger connection signal is detected by interruption with the connection signal (D9. to be described later) (step C2) and the signal No. 1, "charge-discharge control data request" (D2) in FIG. 6, transmitted from the charger 112 is received (step C3), the battery controller 105 determines whether or not a refreshment discharge is necessary (step C4), creates charge-discharge control data (step C5), and the charge-discharge control data shown in FIG. 4 is transmitted from the battery controller 105 to the charger 112 (step C6).

The step C4 of determining whether or not a refreshment discharge is necessary is performed depending on; (1) the number of charges, the number of discharges, or the number of charge-discharge cycles from the first or previous refreshment discharge, (2) whether or not a refreshment discharge has been performed after a necessity of a refreshment discharge is displayed, or (3) the difference between the actual capacity and the discharge capacity up to the time when the discharge stop voltage is detected. For example, a refreshment discharge is determined as necessary when the number of charge-discharge cycles is greater than 14 and the refreshment discharge has not been performed after the necessity of a refreshment discharge is displayed.

Next, when reception of the "charger condition" signal is waited for (step C7) and the signal is correctly received (step C8), determination is made whether or not a signal of refreshment discharge going on is contained in the charger condition data (step C9). If it is determined that the refreshment discharge is going on, measurements of battery temperature, voltage, and current are performed (step C10), residual battery capacity is calculated (step C11), and the battery condition data shown in FIG. 5 is transmitted to the charger 112 (step C12).

When the charger 112 is connected to the battery controller 105 (step C13) and the present refreshment discharge is not in the second stage (step C14), and the first stage of refreshment discharge is over (step C15), learning of the actual battery capacity is performed (step C16), and the process returns to the step C7. In the step C16 above, the actual capacity, namely the maximum capacity learning value of the battery at the present time point is determined from the sum of the discharge by devices, namely the discharge amount while the vehicle is running, and the discharge amount during the refreshment discharge occurring by the end of the first stage of discharge.

In the case the present refreshment discharge is in the second stage in the step C14 above, and then the second stage of discharge is over (step C17), the cycle counter is cleared (step C18), and the process returns to the step C7. In the case the second stage of discharge is not over in the step C17, the process returns immediately to the step C7.

In the case it is determined in the step C9 that the refreshment discharge is not being made, the battery temperature, the voltage, and the current are measured (step C19), the residual battery capacity is calculated (step C20), and the battery condition data shown in FIG. 5 is transmitted to the charger 112 (step C21).

When the charger 112 is connected to the battery controller 105 (step C22) and the present refreshment discharge is not in the second stage (step C14), and a charge over signal is detected from the "charger condition data" (step C23), the process returns to the standby mode of the step C1. Here, also in the case the connection between the battery controller 105 and the charger 112 is not detected in the steps C13 and C22, the process returns to the standby mode of the step C1.

When the "charger condition data" signal is not received correctly in the step C8 above, it is deemed to be communication anomaly (step C24), and anomaly display 2 is made by alternate flashing on the display device 133 (step C25).

Next in reference to FIG. 11, operation after connecting the AC plug of the charger 112 in a preparation stage will be described. When the plug 123 of the charger 112 is plugged to an outlet (step D1), detection of connection of the battery case 100 is waited for (step D2).

When the connection is detected (step D2) and voltage V of the chargeable battery 102 is detected (step D3), preliminary charge is performed with a charge current of 0.5 A (step D4), the display device 133 shows that charge is going on (step D5), and a timer is turned on to count the charging time (step D6).

When the voltage of the chargeable battery 102 exceeds 20 V (step D7), the charging output is stopped(step D8), a charger connection signal received in the step C2 above is transmitted from the charger 112 to the battery controller 105 (step D9). Transmission of the "charge-discharge control data request" signal shown in FIG. 6 and to be received in the step C3 above is started (step D10), and if the charge-discharge control data transmitted in the step C6 is correctly received (step D11), the process goes to the refreshment discharge mode which will be described later.

When the charge-discharge control data is not received correctly in the step D11 above, it is deemed to be communication anomaly (step D12), and anomaly display 2 is made on the display device 133 (step D13), and the process is finished.

When the state of the voltage not greater than 20 V in the step D7 continues for 60 minutes (step D14), anomaly display 1 is made on the display device 133 (step D15), and the process is finished.

Next in reference to FIG. 12, the refreshment discharge process operation of the charger 112 will be described. When the charger 112 is in the refreshment discharge mode (step E1) and the "refreshment notifying" signal is included in the charge-discharge control data created in the step C5 (step E2), for example an LED constituting the display device 133 flashes for a certain period of time to notify the necessity of a refreshment discharge operation (step E3), and the timer is turned on to start measuring the elapsed time (step E4). In the case the "refreshment notifying" signal is not included in the step E2, the process goes to the charge mode which will be described later.

When the refreshment switch 131 is not pressed within a specified period of time from the start of measuring time in the step E4, it is deemed to be an overtime (steps E5, E6), the refreshment notifying display is turned off (step E7), and the process goes to the charge mode which will be described later. This makes it possible to skip the refreshment discharge in a hurry and shorten the charging time.

When the refreshment switch 131 is operated within a specified period of time in the step E5, the display changes to indicate the refreshment notification (step E8), and of the charger condition data including the "charge-discharge control data" is started to be transmitted from the charger 112 to the battery controller 105 (step E9), and the first stage of refreshment discharge of the chargeable battery is started (step E10).

When the battery condition data, shown in FIG. 5 and transmitted in the step C12, is correctly received (step E11) and it is determined to finish the first stage of refreshment discharge on the basis of the data contents (step E12), the second stage of refreshment discharge is started (step E13). The first stage of refreshment discharge is switched from the first stage to the second stage of discharge when the battery voltage reaches the first stage discharge stop voltage V1.

Next, when the battery condition data shown in FIG. 5 and transmitted in the step C12 is correctly received (step E14) and it is determined to finish the first stage of refreshment discharge on the basis of the data contents (step E15), the refreshment notifying display is turned off (step E16), the transmission of the "charger condition data" signal started in the step E9 is stopped (step E17), the refreshment discharge is finished (step E17), and the process goes to the charge mode which will be described later. In the case the determination is made not to finish the second stage of refreshment discharge in the step E15, the processes of steps E14 and E15 are repeated.

When the battery condition data is not received correctly in the steps E11 and E14, it is deemed to be communication anomaly (steps E19 and E21), and an anomaly display 2 appears on the display device 133 (steps E20 and E22) and the process is finished.

The two stages of refreshment discharge in the steps E10 and E13 above are performed as shown in FIGS. 7 and 8. That is, the first stage of discharge is made with the pulse waveform of current $I_1$ which is greater than the current $I_0$ of the second stage of discharge, and the second stage of discharge is made with a constant current or constant resistance. It is also made that the power consumption is the same between the first and second stages of discharge, and that the switching from the first to the second stage is made when the battery voltage reaches the first stage refreshment discharge stop voltage.

Next in reference to FIG. 13, the charge process operation with the charger 112 will be described.

When the charger 112 moves on to the charge mode (step F1), transmission of the charger condition data including the "battery condition data request" signal shown in FIG. 6 from the charger 112 to the battery controller 105 is started (step F2). When the battery condition data shown in FIG. 5 and transmitted from the battery controller 105 in the step C21 is correctly received (step F3), determination is made whether or not the battery temperature in the battery condition data is within the charge start temperature range between the lower and upper limits of charge start temperature preset in the charge-discharge control data (step F4). If not within that range, charge is made to wait (step F5) and the LED of the display device 133 flashes to indicate the charge standby state (step F6), and the process moves on to the step F3.

When the battery temperature is determined to be within the charge start temperature range in the step F4 above, charge is started (step F7), measuring the elapsed time is started with a total timer (step F8), the charger condition data including the "battery condition data request" signal shown in FIG. 6 is transmitted from the charger 112 to the battery controller 105 (step F9). When the battery condition data shown in FIG. 5 and transmitted from the battery controller 105 in the step C21 is correctly received (step F10), charge finish determination is made (step F11). If the charge finish determination is not made, the process returns to the step F9, and the steps F9 to F11 are repeated.

When the charge finish is determined in the step F11 from the battery condition data received, charger condition data including either the "charge finish" signal of No. 9 or the "charge stop" signal of No. 10 shown in FIG. 6 and received in the step C21 is transmitted from the charger 112 to the battery controller 105 (step F12) and also measuring the elapsed time with a supplementary charge timer is started (step F13), supplementary charge (for example with 0.5 A×2 h) is started (step F14), and when a specified period of time elapses the supplementary charge is stopped to finish this process.

When the battery condition data shown in FIG. 5 is not received correctly from the battery controller 105 in the step F3 or F10 above, it is deemed to be communication anomaly (steps F16 and F18), the anomaly display 2 appears on the display device 133 (steps F17 and F19), and the process is finished.

As described above, the power source system 21 of this embodiment is adapted as shown in FIGS. 7 and 8 to perform the first stage of discharge with the discharge current of $I_1$ the pulse waveform. As a result, it is possible to make the discharge current of $I_1$ nearly equal to the discharge current of a running vehicle, for example 5 A, and to accurately learn the actual capacity at a low cost without increasing necessary cooling performance. It is also adapted that the second stage of discharge is made with a small current of about 1/10 of the discharge current of a vehicle in a running state. As a result, it is possible to perform refreshment discharge without having the problem of cooling performance and to eliminate the memory effect.

It is also adapted that the power consumption is nearly the same between the first and the second stages. As a result, the amount of heat generated is also nearly the same between the first and the second stages. This results in that cooling is required only for the heat generated during continuous discharge with the above-mentioned 0.5 A, making it possible to eliminate the necessity of increasing the cooling performance, and to reduce cost accordingly.

It is also adapted that the discharge is switched from the first to the second stage when the battery voltage V reaches the first stage refreshment discharge stop voltage in the charge-discharge control data shown in FIG. 4. As a result, it is possible to reliably switch from the large discharge current of the first stage to the small discharge current of the second stage.

It is also adapted in the step A4 to learn the actual battery capacity based on the sum of the discharge capacity for the refreshment for the period ending at the end of the first stage of discharge and the discharge capacity for the discharge with devices, namely the discharge capacity while the vehicle is running. This also makes it possible that the actual capacity can be learned accurately.

It is also adapted that, in the steps A1 and A2, learning the actual battery capacity is performed only when the number of charge-discharge cycles from the first or previous refreshment discharge is within a certain value, or when the previous discharge is finished. As a result, it is further possible to learn the actual battery capacity accurately.

In the power source system 21 of the first embodiment described above, the battery case 100 and the charger 112 are made separate from each other, with the charger 112 not mounted on the vehicle and with the battery case 100 mounted on the vehicle. However, it is also possible to combine the charger 112 and the battery case 100, which may be separated from each other, into a single unit which is removably mounted on the vehicle. In any case, the charger 112 and the battery case 100 are to be interconnected with a connectors. It is also possible to make the charger and the battery case as a completely single unit which may be removably mounted on the vehicle. It is also possible to constitute that the charger and the battery case are always mounted on the vehicle and a plug on the charger side has only to be plugged into an outlet at the time of charging.

Figure 14:
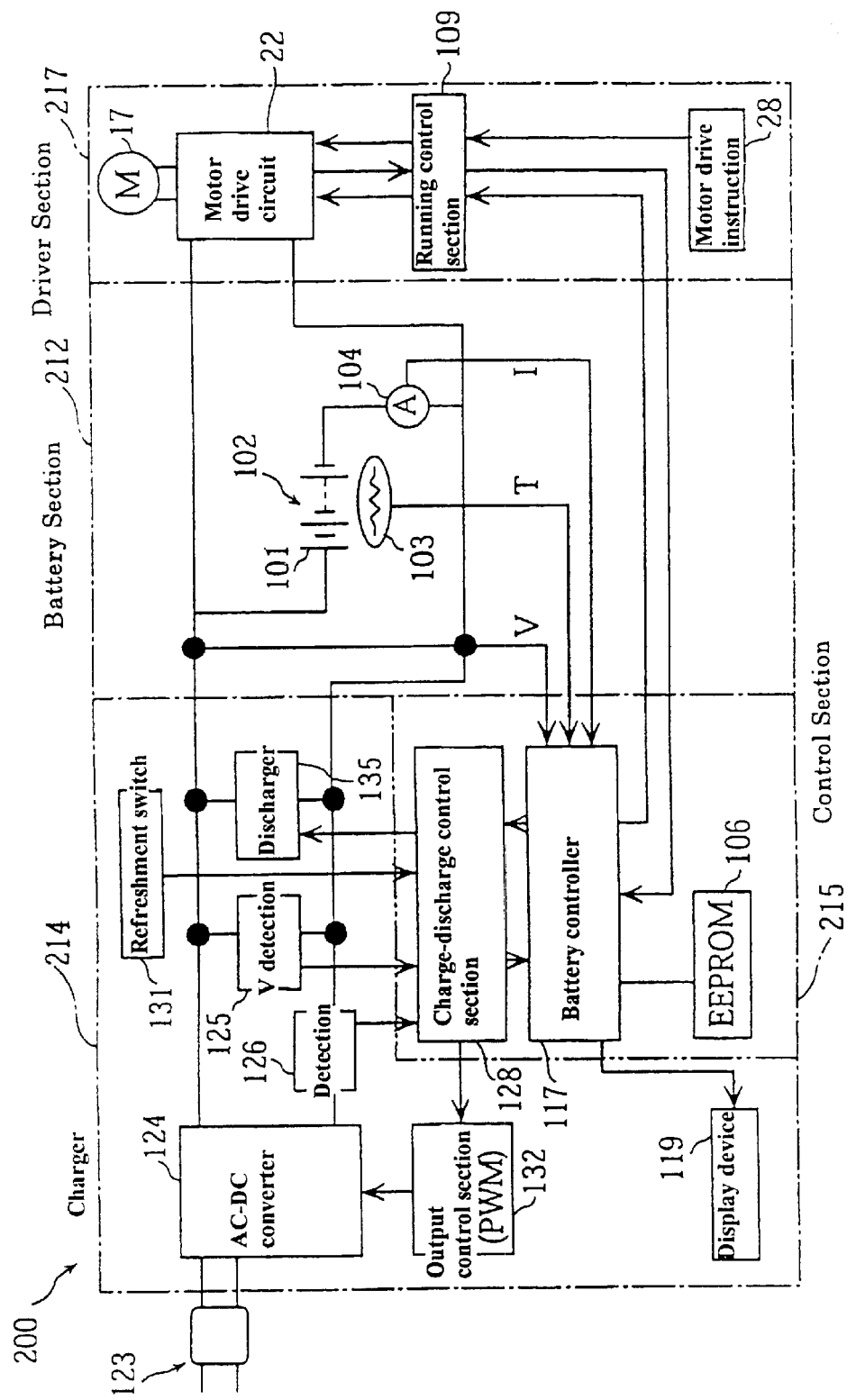
FIG. 14 is a block constitution diagram of a power source system in a second embodiment.
Figure 15:
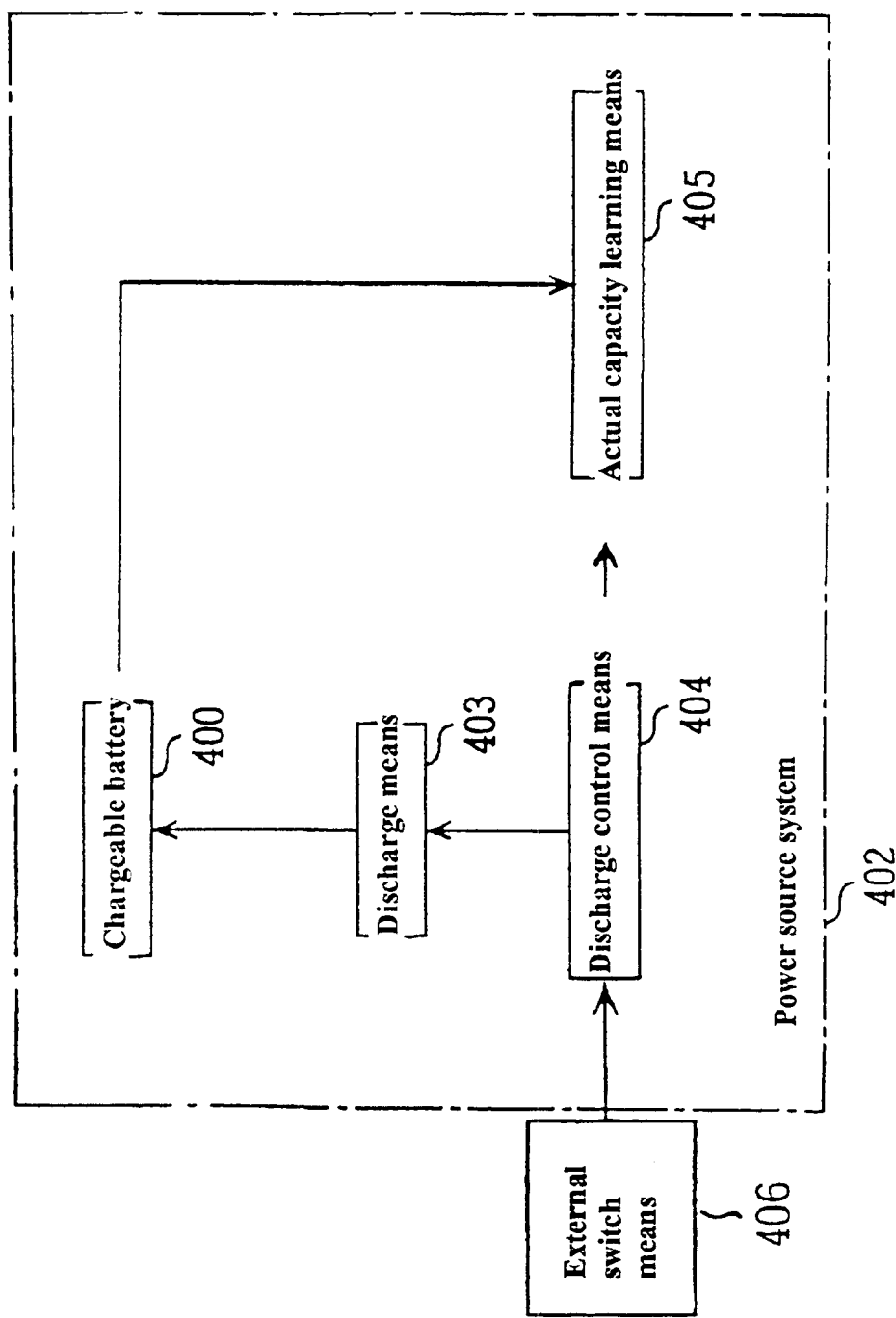
FIG. 15 shows a block constitution of the invention.

FIG. 14 shows a second embodiment in which the battery case and the charger are permanently mounted on a vehicle, for example an electric motor-operated scooter. The same symbols as those in FIGS. 1 and 2 denote the same or equivalent parts. A power source system 200 of this embodiment comprises; a battery section 212 having a battery 102 comprising a plural number of single batteries 101 connected in series, a charging section 214 for charging the battery 102, a control section (ECU) 215 for controlling charging with the charging section 214 and for controlling refreshment discharge, and a drive section 217 for controlling the drive of the motor 17.

The control section 215 comprises a charge-discharge control section 128 and a battery control section 117. The charge-discharge control section 128 receives inputs of various measurement values from the ammeter 126 and the voltmeter 125 connected to the output side of the AC-DC converter 124 and discharge instructions from the refreshment switch 131, and controls an output control section 132 and a discharger 135. The battery control section 117 receives inputs of the battery voltage value V, temperature detection value T from the temperature sensor 103, and the battery current value I from the ammeter 104. The drive section 217 comprises a drive control section 109 which receives inputs of drive instructions 28 from outside such as instructions from the throttle grip and controls the motor drive circuit 22.

While the refreshment discharge of this embodiment is divided into two stages, the number of division is not limited to two but may be any number as long as the refreshment discharge is performed with any combination of pulse waveform current discharges and constant current discharges.

The above-described embodiment is arranged that the refreshment notifying display is made when conditions for requiring refreshment discharge are met and that the refreshment discharge is made when the user operates the refreshment switch within a specified period of time for which the display remains displayed. However, the embodiment of claim 8 is provided with a refreshment forcing switch (external switch means) 138 (FIGS. 2 and 3) for inputting into the battery control section 117 a refreshment request signal for forcing the discharger (discharge means) 135 to perform refreshment discharge.

The refreshment forcing switch 138 is constituted to become effective when pressed and held for a relatively long period of time (for example about 40 seconds) to prevent it from being abused. When the refreshment forcing switch 138 is effectively pressed, refreshment is determined to be necessary irrespective of the determination in the step C4 of FIG. 10, charge-discharge control data including refreshment forcing signal is created and transmitted in steps C5 and C6. And on the charger 112 side, refreshment discharge is automatically performed irrespective of on or off state of the refreshment switch 131. Incidentally, the manner of refreshment discharge is similar to that in the above-described embodiments.

As described above, the embodiment of claim 8 is adapted that the refreshment discharge is automatically made when the refreshment forcing switch is effectively pressed. Therefore, for example even when the conditions for requiring refreshment are not met and nevertheless it is necessary to learn the actual battery capacity, it is possible to forcibly cause the refreshment discharge from outside and to learn the actual capacity accurately from the discharge capacity of the refreshment discharge.

Industrial Applicability

With the power source system 402 for electric motor-operated vehicles of the invention of claim 1, the refreshment discharge is made with a discharge current including pulse waveform portion, and the actual capacity is learned from the discharge capacity including the capacity of the refreshment discharge with the pulse waveform current. With the invention of claim 2, the actual capacity is determined from the sum of the discharge capacity during running and the discharge capacity during the refreshment discharge. With the invention of claim 3, it is determined from the discharge capacity of the refreshment discharge consisting of the pulse waveform current portion and the constant current portion. With the invention of claim 4, the refreshment discharge is divided into two stages, with the first stage made with the pulse waveform current greater than the current of the second stage which is constant with constant resistance, and the actual capacity of the chargeable battery is learned from the discharge capacity for the period ending at the end of the first stage of discharge. Therefore, it is possible to accurately learn the actual capacity of the chargeable battery.

Since it is adapted that the refreshment discharge is made with the discharge current of pulse waveform, there is less limitation from the cooling ability and so the pulse current value may be set close to the current value of a running vehicle, for example about 5 A. As a result, learning the actual battery capacity may be made at a low cost. Since the second stage is made with a small current, the refreshment discharge may be made free from the problem of cooling ability, and the memory effect may be eliminated.

With the invention of claim 5, since the power consumption of the first stage of discharge is made nearly the same as that of the second stage, making it possible to use the same cooling in the first and second stages, the refreshment discharge may be made with a minimum of cooling ability without causing ability imbalance.

With the invention of claim 6, since it is adapted that the discharge is switched from the first to the second stage when the battery voltage reaches the specified value, the actual battery capacity may be accurately learned.

With the invention of claim 7, since it is adapted that the actual capacity learning is made only when the previous charge is completed without interruption and the number of charge-discharge cycles since the first or previous refreshment discharge of the battery is within the specified value, the actual battery capacity may be accurately learned.

With the invention of claim 8, since it is made possible to forcibly perform the refreshment discharge as required by entering the refreshment request signal from the external switch means, for example even when the conditions for requiring refreshment are not met and nevertheless it is necessary to learn the actual battery capacity, it is possible to forcibly perform the refreshment discharge. This makes it possible to learn the actual capacity accurately from the discharge capacity for the refreshment discharge.

What is claimed is:

1. A power source system for electric motor-operated vehicles adapted to determine the actual capacity of a rechargeable battery when the battery is used in cycles, said power source system comprising; a discharge means for performing refreshment discharge of the rechargeable battery, a discharge control means for controlling the discharge means to perform the refreshment discharge with a discharge current including a pulse waveform portion, and an actual capacity learning means for learning the actual capacity of the rechargeable battery on the basis of discharge capacity including the discharge capacity at the time of refreshment with the pulse waveform current.

2. A power source system for electric motor-operated vehicles of claim 1, characterized in that the actual capacity learning means determines the actual capacity of the rechargeable battery on the basis of the sum of the discharge capacity during running caused by the running of the vehicle and the discharge capacity at the time of refreshment.

3. A power source system for electric motor-operated vehicles of claim 2, characterized in that the refreshment discharge is performed with a discharge current consisting of a pulse waveform current part and a constant current part.

4. A power source system for electric motor-operated vehicles of claim 3, characterized in that the discharge control means controls the discharge means so that the refreshment discharge is divided into two stages, with a first stage of discharge performed with the pulse waveform current being set greater than the discharge current of a second stage of discharge and the second stage of discharge is performed with the constant current, and that the actual capacity learning means learns the actual capacity from the discharge capacity for the period up to the end of the first stage of discharge.

5. A power source system for electric motor-operated vehicles of claim 4, characterized in that the discharge control means controls the discharge means so that the average discharge capacity (electric power) for the first stage of discharge is nearly equal to the discharge capacity (electric power) for the second stage of discharge.

6. A power source system for electric motor-operated vehicles of claim 1, characterized in that the refreshment discharge is performed with a discharge current consisting of a pulse waveform current part and a constant current part.

7. A power source system for electric motor-operated vehicles of claim 6, characterized in that the discharge control means controls the discharge means so that the refreshment discharge is divided into two stages, with a first stage of discharge performed with the pulse waveform current being set greater than the discharge current of a second stage of discharge and the second stage of discharge is performed with the constant current, and that the actual capacity learning means learns the actual capacity from the discharge capacity for the period up to the end of the first stage of discharge.

8. A power source system for electric motor-operated vehicles of claim 7, characterized in that the discharge control means controls the discharge means so that the average discharge capacity (electric power) for the first stage of discharge is nearly equal to the discharge capacity (electric power) for the second stage of discharge.

9. A power source system for electric motor-operated vehicles of claim 8, characterized in that the discharge control means switches the first stage of discharge to the second stage of discharge when the battery voltage reaches a specified voltage.

10. A power source system for electric motor-operated vehicles of claim 7, characterized in that the discharge control means switches the first stage of discharge to the second stage of discharge when the battery voltage reaches a specified voltage.

11. A power source system for electric motor-operated vehicles of claim 10, characterized in that the actual capacity learning means learns the actual capacity of the battery when the previous charge is completed without interruption and the number of charge-discharge cycles since the first or previous refreshment discharge of the battery is within a specified value.

12. A power source system for electric motor-operated vehicles of claim 11, characterized by comprising an external switch means for inputting into the discharge control means a refreshment request signal for causing the discharge means to perform a refreshment discharge.

13. A method for determine the actual capacity of a chargeable battery in a power source system for electric motor-operated vehicles where the battery is used in cycles, said method comprising the steps of performing refreshment discharge of the chargeable battery, controlling the discharge to perform the refreshment discharge with a discharge current including a pulse waveform portion, and learning the actual capacity of the chargeable battery on the basis of discharge capacity including the discharge capacity at the time of refreshment with the pulse waveform current.

14. A method for determine the actual capacity of a chargeable battery of claim 13, characterized in that the actual capacity of the chargeable battery is determined from the sum of the discharge capacity during running caused by the running of the vehicle and the discharge capacity at the time of refreshment.

15. A method for determine the actual capacity of a chargeable battery of claim 14, characterized by performing refreshment discharge with a discharge current consisting of a pulse waveform current part and a constant current part.

16. A method for determine the actual capacity of a chargeable battery of claim 15, characterized by dividing the refreshment discharge into two stages, with the first stage of discharge performed with the pulse waveform current set greater than the discharge current of the second stage of discharge and the second stage of discharge is performed with the constant current, and that the actual capacity learning means learns the actual capacity from the discharge capacity for the period up to the end of the first stage of discharge.

17. A method for determine the actual capacity of a chargeable battery of claim 16, wherein the average discharge capacity (electric power) for the first stage of discharge is set to be nearly equal to the discharge capacity (electric power) for the second stage of discharge.

18. A method for determine the actual capacity of a chargeable battery of claim 17, wherein the first stage of discharge is switched to the second stage of discharge when the battery voltage reaches a specified voltage.

19. A method for determine the actual capacity of a chargeable battery of claim 18, wherein the actual capacity of the battery is learned when the previous charge is completed without interruption and the number of charge-discharge cycles since the first or previous refreshment discharge of the battery is within a specified value.

* * * * *